United States Patent Office 2,766,848
Patented Oct. 16, 1956

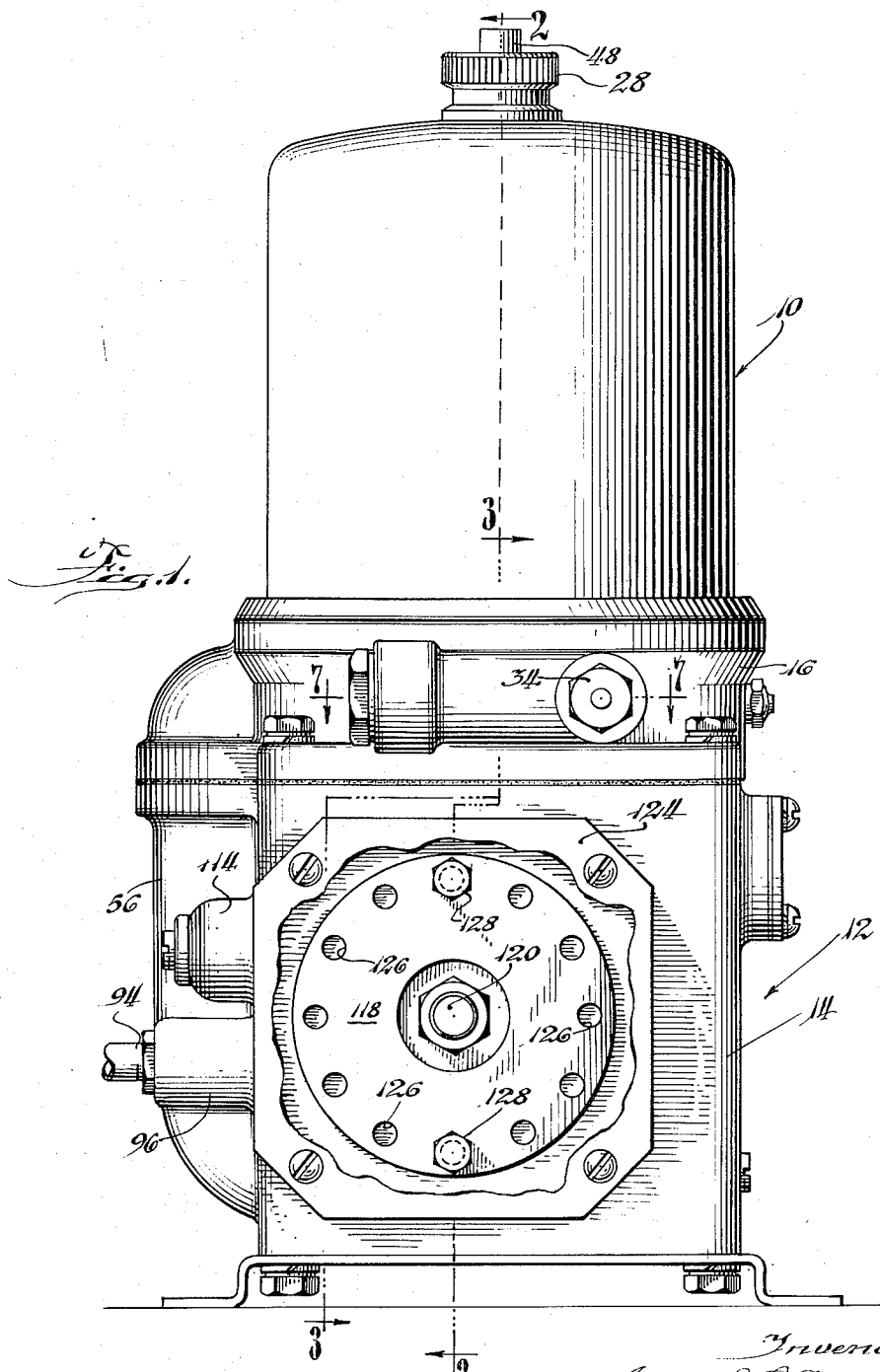

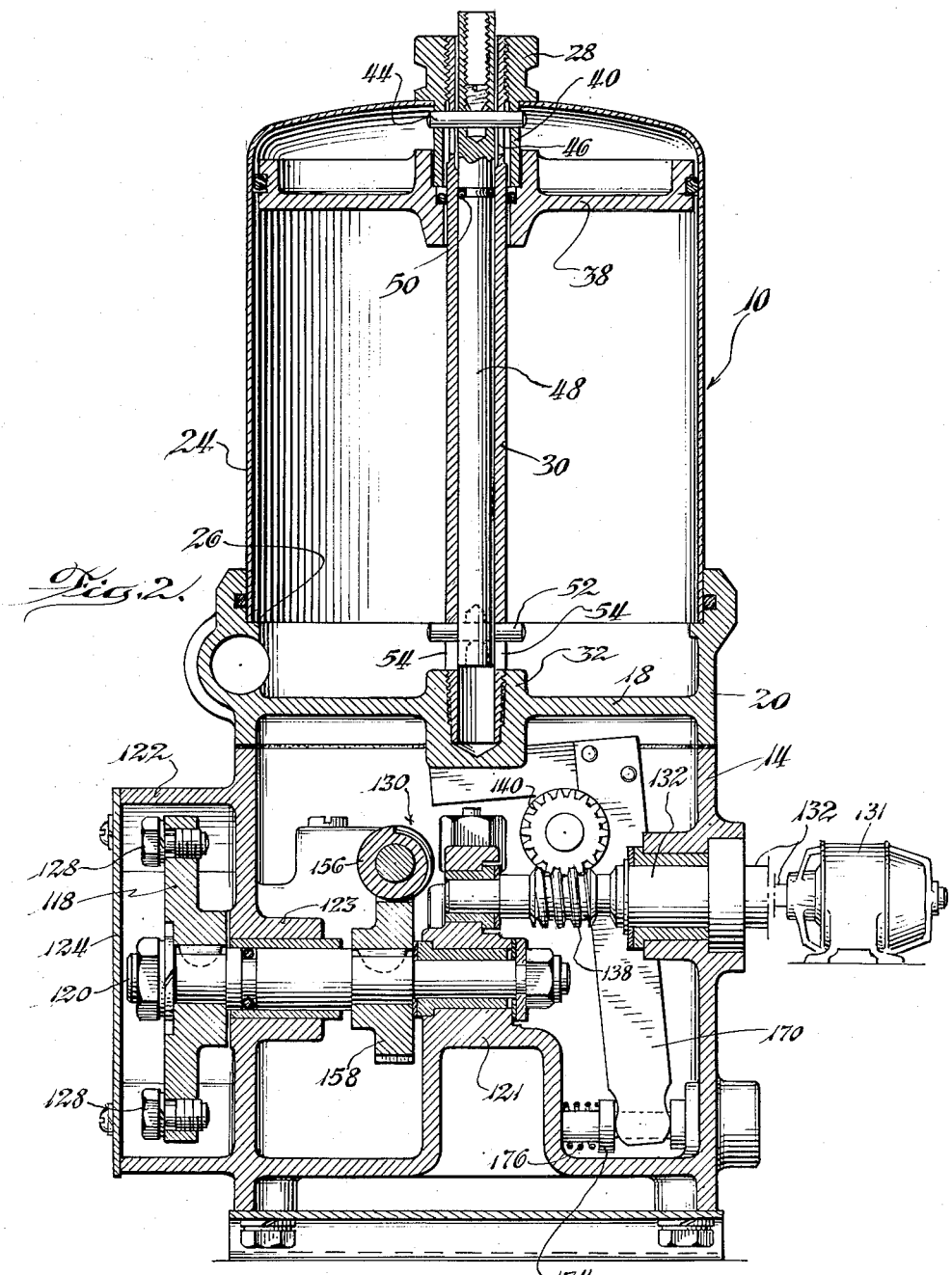

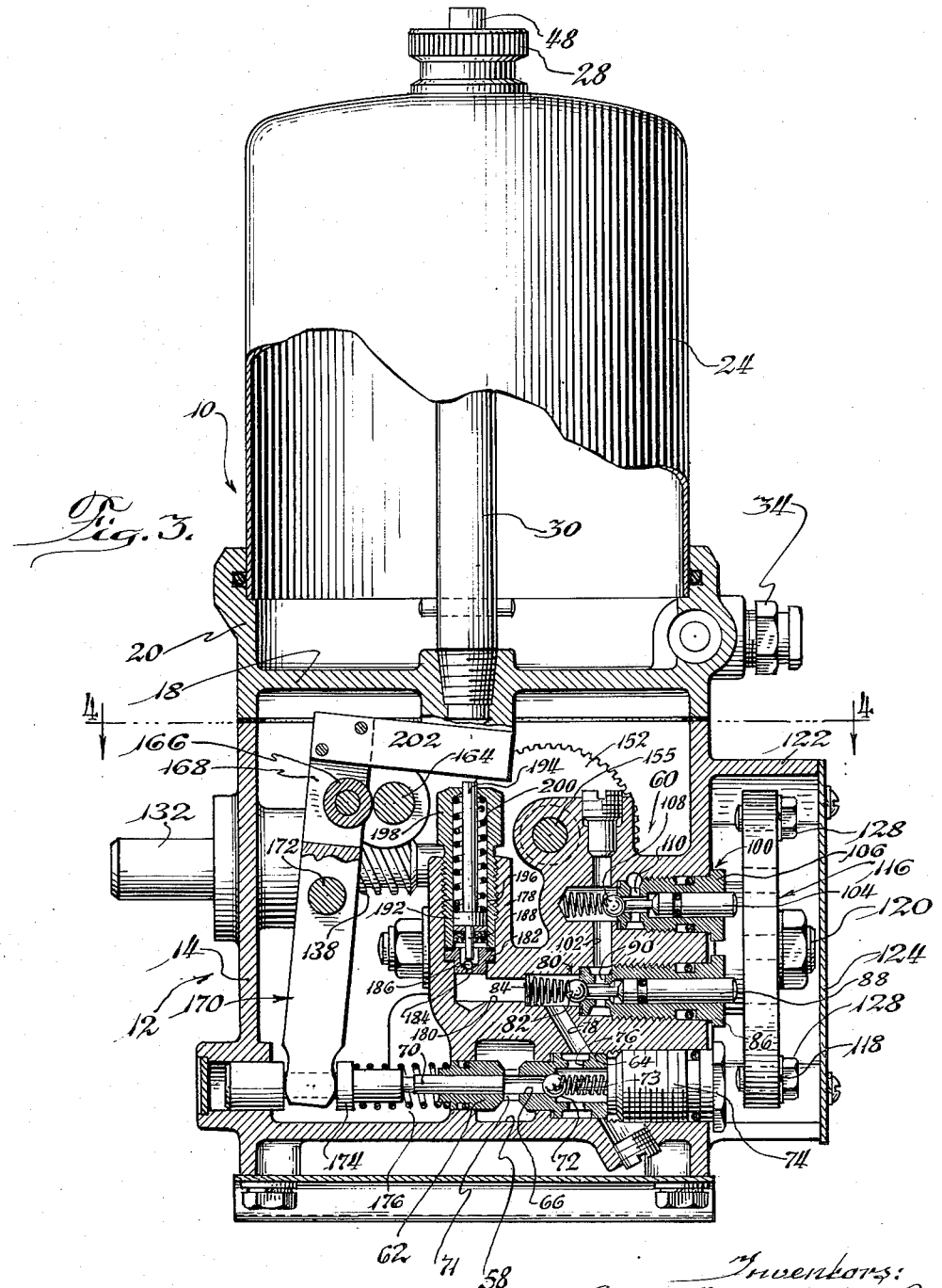

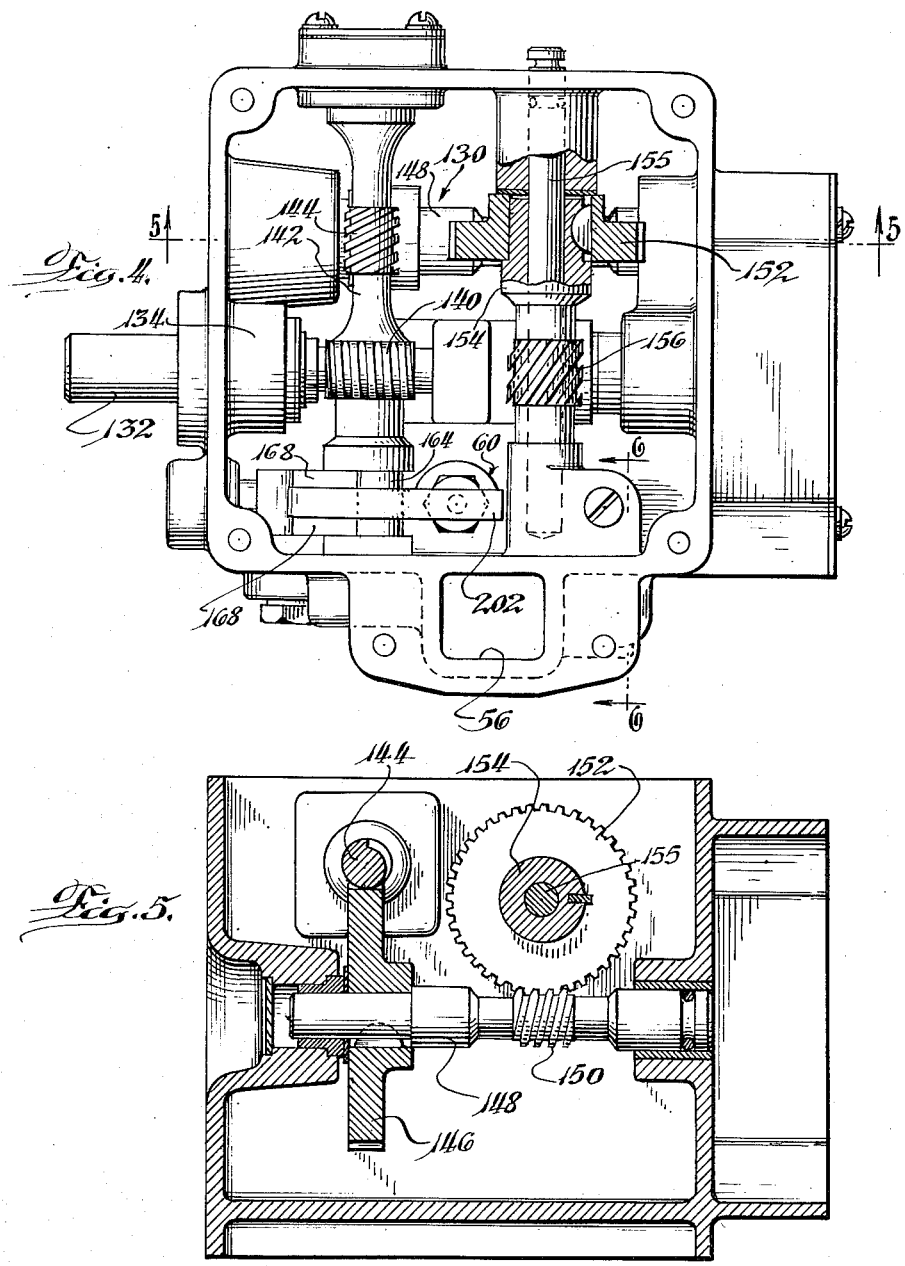

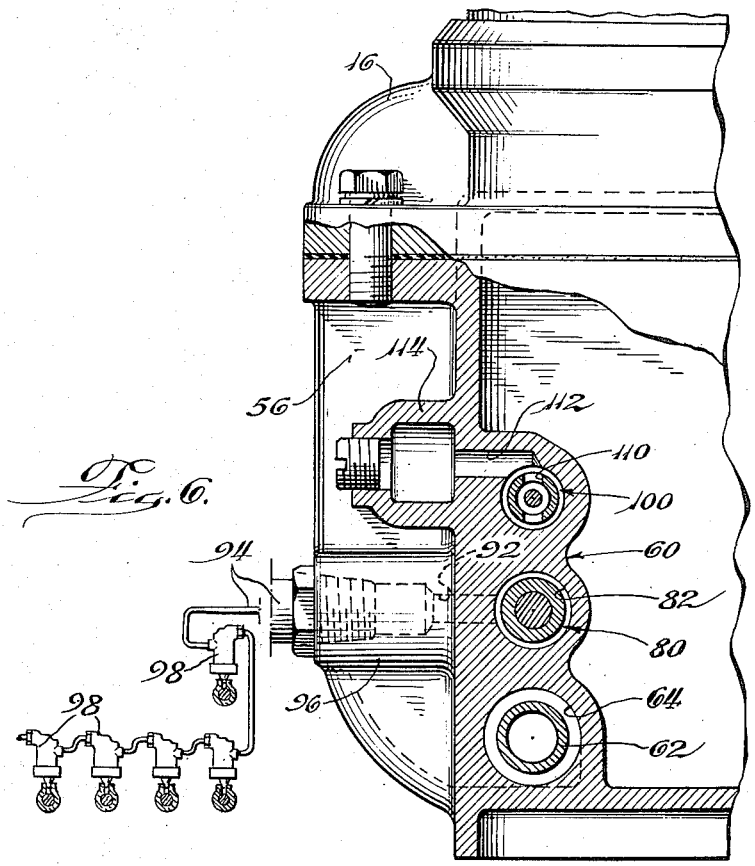
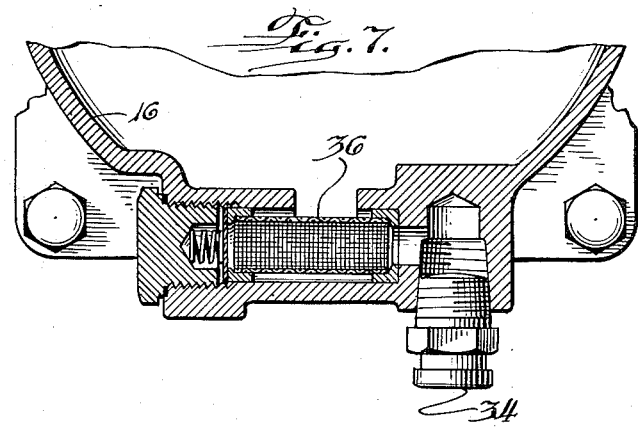

2,766,848

PRESSURE FLUID SUPPLY UNIT FOR CENTRALIZED LUBRICATING SYSTEMS

Joseph C. Bystricky and Jose L. Luna, Chicago, Ill., assignors to Stewart-Warner Corporation, Chicago, Ill., a corporation of Virginia Application January 26, 1954, Serial No. 406,307

7 Claims. (Cl. 184—27)

The present invention relates to a central unit for intermittently charging fluid under pressure through a supply line to lubricant measuring or feeder valves of a centralized lubricating system.

One object of the invention is to provide a self-contained lubricant supply unit which upon being driven continuously by a conventional electric motor or the like is automatically operable at predetermined regular intervals to discharge fluid under pressure into a supply line of a centralized lubricating system and then relieve the pressure on the line to permit operation of conventional lubricating measuring or feeder valves fed by the line.

A further object is to provide a lubricant supply unit of the above character having a self-controlled supply pump which is automatically operated from a continuously running drive only as necessary to maintain a ready supply of lubricant under pressure.

Another object is to provide a central lubricant supply unit in which a single speed reducing transmission operates a self-controlled pump and positively drives timing means for effecting intermittent discharging of lubricant into a supply line at regular intervals.

Other objects and advantages will become apparent from the following description of the form of the invention shown in the drawings, in which:

Figure 1 is a side view of a lubricant supply unit incorporating the invention;

Fig. 2 is a vertical sectional view taken along the line 2—2 of Fig. 1, and showing schematically an electric motor connected to the unit;

Fig. 3 is a side view sectioned along line 3—3 of Fig. 1;

Fig. 4 is a horizontal sectional view taken generally along line 4—4 of Fig. 3, certain parts being broken away for clearness in illustration;

Fig. 5 is a vertical sectional view taken along line 5—5 of Fig. 4;

Fig. 6 is a fragmentary sectional view of the base taken generally along the line 6—6 of Fig. 4 and indicating schematically the manner in which the unit is interconnected with a supply line and valves of a centralized lubricating system; and Fig. 7 is a fragmentary sectional view taken along the line 7—7 of Fig. 1.

As shown in Figs. 1, 2 and 3, the lubricating unit incorporating the invention comprises a reservoir 10 mounted on a generally square base 12 to feed lubricant into pumping means in the base. The base 12 itself is formed by a deep, upwardly open lower casting 14 and a relatively thin upper casting 16 bolted to the lower casting. The upper casting 16 comprises a horizontal web 18 integral with a peripheral flange 20 shaped to rest on the upper edge of the lower casting 14 and adapted to form a fluid tight seal with the lower edge of a bell jar shaped cover 24. The cover is held firmly against a radial flange 26 on the rim 20 by a knurled nut 28 on the upper end of a tube 30 which extends downwardly through the cover into a threaded boss 32 on the web 18.

Lubricant is charged into the lower end of the reservoir 10 through a coupling 34 and a strainer 36 mounted on one side of the upper casting 16 as shown in Figs. 1, 3 and 7. A follower piston 38 encircling the tube 30 rides upwardly on the surface of the fluid. When the reservoir has been filled to capacity, as indicated in Fig. 2, a cylindrical seal retaining insert 40, fitted into the central hub of the follower 38, engages opposite ends of a horizontal pin 44 which protrude outwardly through vertical slots 46 formed in the tube 30 just under the cover 24. The pin 44 extends transversely through an indicator rod 48 slidable within the tube 30 and thus, when the pin is lifted by the piston 38, the rod 48 is raised so that its upper end protrudes above the nut 28 to indicate that the reservoir is full. The rod is held in this raised position by an O-ring seal 50 between the rod and the tube 30.

The need for refilling the reservoir 10 is indicated by downward displacement of the rod 48, which is effected by engagement of the central hub of the follower piston 38 with opposite ends of a second transverse pin 52. This second pin is secured through the rod 48 near its lower end with its ends projecting outwardly through vertical slots 54 in the tube 30.

From the reservoir 10 lubricant flows downwardly through a chute 56, on one side of the base 12, to a space 58 in the lower portion of a pump and valve housing 60 cast integral with the inner face of the adjacent base wall, see Figs. 1, 3 and 6. The space 58 is traversed by a horizontal pump sleeve 62 mounted in a counterbored passage 64 machined in the lower casting. The sleeve 62 has a coaxial bore 66 which forms a pump cylinder provided with a reciprocating plunger 70. Fluid drawn into the pump cylinder 66 through radial openings 71 in register with the space 58 is forced by the plunger out around a ball check valve 72 seated against the right end of the bore 66, Fig. 3, by a compression spring 73. The opposite end of this spring is based against a threaded plug 74 that also seats the pump sleeve solidly in the counterbored passage 64.

From the pump outlet valve, lubricant is forced through radial passages 76 in the enlarged outer end of the pump sleeve and through a bore 78 to a charging valve 80. The charging valve comprises a ball 82 held by a spring 84 against a seat on the inner end of a sleeve 86 threaded into a second horizontal bore formed in the housing 60 just above the pump. A valve opening plunger 88, slidable in the sleeve 86, protrudes outwardly beyond the adjacent side wall of the base with its outer end in a position such that the plunger can be moved inwardly against the ball 84 by an actuating means which will be presently described.

Upon opening of the charging valve 80, fluid under pressure flows through radial sleeve openings 90 and a horizontal bore 92 in the housing 60 into a fluid line 94 threaded into a boss 96 formed on the base adjacent the chute 56 (see Figs. 3 and 6). As indicated diagrammatically in Fig. 6, the line 94 is connected to conventional measuring or feeder valves 98 for the various lubrication points of the lubrication system.

After being held open for a short period of time by the actuating means to be presently described, the charging valve 80 is allowed to close. Then, to permit the conventional measuring valves 98 of the centralized lubricating system to complete their cycle of operation, the fluid pressure in the line 94 is relieved by the opening of a venting or relief valve 100 mounted in the housing 60 just above the charging valve 80 and communicating with the outlet of the latter through a bore 102.

Being generally similar in construction to the charging valve 80, the venting valve 100 comprises a plunger 104 slidably mounted in a horizontal sleeve 106 and adapted to unseat a spring pressed ball 108 which normally closes the inner end of the sleeve. Upon opening of the venting valve 100, fluid from the outlet side of the charging valve 80 escapes through radial openings 110 in the venting valve sleeve, a horizontal bore 112, and a hollow boss 114 which communicates with the chute 56.

At regular intervals the charging valve 80 and the venting valve 100 are opened in sequence by a cyclic actuator 116. This actuator comprises a rotary disc 118 mounted on the outer end of a shaft 120 disposed at one side of the valves and journaled in a central support 121 in the base 12 and in a boss 123 on one side of the base (see Figs. 1, 2 and 3). Located on the outside of the base proper, the disc 118 is encircled by an annular flange 122 on the lower casting 14 and covered by a removable plate 124. As shown in Fig. 1, a plurality of threaded, circumferentially spaced holes 126 parallel to the shaft 120 are formed near the peripheral edge of the disc 118 to receive one or more actuating screws 128. For purposes of illustration, two screws 128 spaced 180° apart are used. In the embodiment illustrated, twelve holes 126 are shown, not principally because twelve screws 128 are likely to be used, but because twelve holes permits equal spacing circumferentially of two, three, four or six screws.

As each screw 128 is carried upwardly by clockwise movement of the disc 118 (as viewed from the right in Fig. 3), the beveled inner end of the screw engages the rounded outer ends of the valve plungers 88 and 104 in turn, forcing the plungers inwardly to open the associated valves 80 and 100 for short periods in succession. The number of lubricant charging cycles carried out per revolution of the disc 118 is determined by the number of screws in the disc.

The actuator disc 118 is rotated constantly at a speed not exceeding one revolution per desired lubricant charging interval by a speed reducing transmission or drive 130 mounted in the base 12 and adapted to be driven continuously by a conventional electric motor 131 (shown schematically in Fig. 2). As shown in Figs. 2 and 4, the transmission 130 comprises a drive shaft 132 (which is connected to the motor) journaled in a side wall boss 134 and in the central support 121. A worm 138 on the medial portion of the drive shaft meshes with an overlying worm wheel 140 carried by a shaft 142 crossing the drive shaft at a right angle and journaled at opposite ends in the casting 14. A worm 144 on the shaft 142, axially spaced from the worm wheel 140, drives a worm wheel 146 carried by the shaft 148. Journaled at opposite ends in the casting 14, the shaft 148 underlies the shaft 142 at 90° to the latter (see Fig. 5). A worm 150 on the shaft 148 meshes with an overlying worm wheel 152 keyed to a quill shaft 154 which is journaled for rotation upon a rod 155 supported in parallel spaced relation to the shaft 142 as shown in Fig. 4. A worm 156 fixed upon the quill shaft 154 and axially spaced from the worm wheel 152, meshes with a worm wheel 158 mounted on the actuator shaft 120 between the boss 123 and the central support 121. The compact transmission thus formed is designed in the present embodiment of the invention to rotate the disc 118 at a rate of one revolution per hour when the drive shaft 132 is driven by a conventional 1725 R. P. M. motor.

The power transmission 130 also drives the fluid pump previously described in part. To accomplish this, the end of the shaft 142 at the pump side of the base 12 is fashioned to form an eccentric cylindrical portion 164, Fig. 3. In operation, the eccentric 164 engages a roller follower 166 journaled between a pair of arms 168 on the upper end of a generally vertical rocker lever 170, medially supported on a transverse pivot pin 172. The lower end of the lever 170 articulates with a horizontal slide 174 mounted in the casting 14 and connected directly to the pump plunger 70. A coiled return spring 176, based against the inner end of the pump sleeve 62 acts against the slide 174 in a direction to maintain the follower roller 166 in engagement with the eccentric 164.

The speed reduction of the drive shaft worm 138 and the coacting wheel 140 on the eccentric shaft 142 is such that the pump is driven at about 430 strokes per minute when the drive shaft 132 is rotated at approximately 1725 R. P. M.

To minimize wear on the pump and to avoid unnecessary consumption of power, the pump is automatically controlled by fluid pressure responsive means to operate only as necessary to maintain a ready supply of fluid under pressure at the charging valve 80 even though the eccentric operator 164 for the pump is driven continuously. As shown in Fig. 3, the fluid pressure responsive pump control comprises a vertically counterbored boss 178 disposed on the side of the eccentric 164 generally opposite from the rocker lever 170 and connected at its lower end with the pump outlet by a passageway 180. A disc 182 seated in the lower end of the passage in the boss 178 defines a small aperture 184. The aperture is normally closed by a small ball 186 attached to the lower end of a cylindrical tip 188 projecting downwardly from a piston portion 192 of a plunger 194. This plunger is vertically slidable in a sleeve 196 and a vertically elongated hollow cap 198 threaded into the boss 178. The plunger 194 is biased downwardly by a compression spring 200 coiled around the plunger 194 between the upper end of the cap 198 and the plunger piston portion 192.

Due to the relatively small area of the ball 186 exposed to the fluid in the aperture 184, the spring 200 is capable of maintaining the aperture closed until the pump outlet pressure reaches a relatively high predetermined level; for example, 2000 pounds per square inch. However, once the ball is unseated, fluid under pressure flows through the aperture to act on the entire lower face of the plunger piston portion 192.

This immediately shifts the plunger 194 upwardly so that its top end, which projects through the cap 198, engages the under side of the free end of a generally horizontal arm 202. This arm is fixed at its opposite end to the upper end of the rocker lever 170 and is disposed in a position above the eccentric 164. With reference to Fig. 3, the lever 170 is swung counterclockwise by this hydraulic action so as to remove the follower roller 166 from the path of the eccentric 164. Reciprocation of the pump therefore ceases.

When the fluid pressure at the pump outlet drops, the spring 200 shifts the plunger 194 downwardly to close the aperture 184 and to allow the pump actuator lever 170 to swing back into coacting relation with the eccentric 164. This automatically restores the pump to effective operation.

In reviewing the overall operation of the intermittent lubricant supply unit thus provided, it will be observed that the actuator transmission 130, which is adapted to be driven by a conventional motor, rotates the actuator disc 118 at a constant rate not exceeding one revolution per lubricant charging cycle. The number of lubricating cycles carried out per revolution of the actuator disc, however, may be more than one and is determined by the number of actuator screws 128 threaded into the disc.

During each revolution of the actuator disc, each of the actuator screws 128 opens the charging valve 80 and holds the valve open for a short period while fluid is charged into a lubricating line from the self-controlled pump fed with lubricant from the reservoir 10. After effecting a short charging cycle in this manner, the charging valve is closed and each actuator screw then opens the venting valve 100 for a short time to relieve the pressure in the lubricant supply line thus permitting reverse operation of the measuring valves fed by the line. The venting valve is then closed to recondition the system for a new cycle of operation produced by the next actuator screw on the disc 118.

Structurally simple, the lubricant supply unit thus provided is extremely dependable in operation. The positive, continuously running drive for the valve actuator produces an unfailing opening and closing of the charging and venting valves in proper sequence to provide the desired intermittent charging of lubricant into a supply line. The self controlled pump always maintains a ready supply of fluid under appropriate pressure, the pump being automatically disabled whenever the outflow of fluid from the unit is stopped.

While we have shown and described a preferred embodiment of our invention, it will be apparent that numerous variations and modifications thereof may be made without departing from the underlying principles and scope of the invention. We therefore desire, by the following claims, to include all such variations and modifications by which substantially the results of our invention may be obtained through the use of substantially the same or equivalent means.

We claim:

1. A central lubricant supply unit operable at predetermined intervals to charge lubricant under pressure into a supply line of a centralized lubricating system and then to relieve the pressure on the line, comprising, in combination, a charging valve adapted to be connected to a lubricant supply line, a venting valve adapted to communicate with the supply line, a rotary actuator positioned to open said charging valve and said venting valve in succession, a speed reducing transmission connected to said actuator for continuously rotating the latter at a rate not exceeding one revolution per lubricant charging interval when driven by a conventional electric motor, a pump energized by said transmission for supplying lubricant under pressure to said charging valve, and pressure responsive pump control means communicating with the pump outlet to disable the pump when the outlet pressure thereof exceeds a predetermined level.

2. A unit for discharging fluid at predetermined intervals, comprising, in combination, a charging valve, a relief valve communicating with the downstream side of the charging valve, an actuator including a rotary disc defining a plurality of circumferentially spaced holes therein adapted to receive actuating members for opening said charging valve and said relief valve in turn, a speed reducing transmission arranged to rotate said disc at a substantially constant speed, and means energized by said transmission for supplying fluid under pressure to said charging valve.

3. A unit for discharging fluid at predetermined regular intervals, comprising, in combination, a valve, a cyclic actuator for said valve, a transmission for driving said actuator continuously, a pump for supplying fluid under pressure to said valve, a drive for said pump including an eccentric operator, an actuator for said pump arranged to coact with said operator, a pressure responsive pump control communicating with the pump outlet and defining an orifice, a spring pressed plunger normally closing said orifice and including piston means substantially larger in diameter than the orifice arranged to be actuated upon opening of said orifice by the outlet pressure of said pump, and means on said actuator for said pump coacting with said plunger to disable said pump when the outlet pressure thereof exceeds a predetermined level.

4. A central lubricant supply unit operable at predetermined intervals to charge lubricant under pressure into a supply line of a centralized lubricating system and then to sharply relieve the pressure on the line, comprising, in combination, a charging valve adapted to be connected to a lubricant supply line, a venting valve communicating with the downstream side of said charging valve, a cyclic actuator positioned to open said charging valve and said venting valve in succession, a speed reducing transmission connected to said actuator for continuously driving the latter at a rate not exceeding one complete cycle per lubricant charging interval when driven by a power source of predetermined substantially constant speed, a pump driven by said transmission for supplying lubricant under pressure to said charging valve, and pressure responsive pump control means communicating with the pump outlet to disable the pump when the outlet pressure thereof exceeds a predetermined level.

5. A central lubricant supply unit operable when driven continuously by a substantially constant speed drive to charge lubricant under pressure at predetermined intervals into a supply line of a centralized lubricating system, comprising, in combination, a charging valve adapted to be connected at the outlet side thereof to a lubricant supply line, a cyclic actuator positioned to positively open said charging valve at least once during each complete cycle of the actuator, a speed reducing transmission connected to said actuator for continuously driving the latter from a constant speed power source, a lubricant supply pump connected to discharge lubricant to the upstream side of said charging valve, said transmission including a continuously rotated eccentric operator for said pump, said pump including an actuator arranged to follow said eccentric operator, and a pressure responsive pump control communicating with the discharge side of said pump and connected with said pump actuator to hold the latter out of effective cooperation with said eccentric operator when the outlet pressure of the pump exceeds a predetermined level.

6. A central lubricant supply unit operable upon being driven continuously from a substantially constant speed power source to charge lubricant under pressure at predetermined intervals into a supply line of a centralized lubricating system, comprising, in combination, a charging valve adapted to be connected at the downstream side thereof to a lubricant supply line, a lubricant reservoir, a venting valve communicating at opposite sides thereof with the downstream side of said charging valve and said lubricant reservoir, a cyclic actuator positioned to positively open said charging valve and said venting valve in succession at least once during each operating cycle of the actuator, a speed reducing transmission connected to said actuator for continuously moving the latter through successive operating cycles when driven by a constant speed power source, a pump connected to receive lubricant from said reservoir and supply lubricant under pressure to the upstream side of said charging valve, coacting pump operating means on said pump and said transmission for actuating the pump from the latter, and pressure responsive pump control means communicating with the pump outlet and connected to said pump operating means to automatically interrupt operation of the pump when the outlet pressure thereof exceeds a predetermined level.

7. A central lubricant supply unit operable upon being driven continuously by a substantially constant speed drive to charge lubricant under pressure at predetermined intervals into a supply line of a centralized lubricating system and then to relieve the pressure on the line, comprising, in combination, a charging valve adapted to be connected at the downstream side thereof to a lubricant supply line, a lubricant reservoir, a venting valve connected between the downstream side of said charging valve and said reservoir, a cyclic actuator positioned to positively open said charging valve and said venting valve in succession at least once during each complete operating cycle of the actuator, a speed reducing transmission connected to said actuator for continuously driving the latter from a constant speed power source, a lubricant pump connected to receive lubricant from said reservoir and discharge lubricant under pressure to the upstream side of said charging valve, and coacting pump operating means on said pump and an intermediate portion of said transmission for actuating said pump from said transmission.

References Cited in the file of this patent

UNITED STATES PATENTS

| | | |
|---|---|---|
| 802,971 | Carl | Oct. 31, 1905 |
| 1,309,611 | Bungay | July 15, 1919 |
| 1,760,999 | Tucker | June 3, 1930 |
| 1,868,167 | Howenstine | July 19, 1932 |
| 1,881,939 | Purdy | Oct. 11, 1932 |
| 1,919,118 | Millington | July 18, 1933 |